(12) United States Patent
Hawley et al.

(10) Patent No.: US 11,422,147 B2
(45) Date of Patent: Aug. 23, 2022

(54) ACOUSTIC DETECTION OF STALL OVER A WING SURFACE

(71) Applicant: Rosemount Aerospace Inc., Burnsville, MN (US)

(72) Inventors: Brian Hawley, New Market, MN (US); Jaime Sly, Savage, MN (US); Brian Daniel Matheis, Lakeville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 413 days.

(21) Appl. No.: 16/694,303

(22) Filed: Nov. 25, 2019

(65) Prior Publication Data

US 2021/0156882 A1    May 27, 2021

(51) Int. Cl.
*G01P 5/24* (2006.01)
*B64D 43/02* (2006.01)
*G01M 9/06* (2006.01)

(52) U.S. Cl.
CPC ........... *G01P 5/24* (2013.01); *B64D 43/02* (2013.01); *G01M 9/065* (2013.01)

(58) Field of Classification Search
None
See application file for complete search history.

(56) References Cited

U.S. PATENT DOCUMENTS

| | | |
|---|---|---|
| 3,630,169 A | 12/1971 | Corey |
| 4,188,823 A | 2/1980 | Hood |
| 4,350,314 A | 9/1982 | Hoadley |
| 4,435,695 A | 3/1984 | Maris |
| 4,516,747 A | 5/1985 | Lurz |
| 4,727,751 A | 3/1988 | Holmes et al. |
| 5,191,791 A | 3/1993 | Gerardi et al. |
| 5,341,677 A | 8/1994 | Maris |
| 5,595,357 A * | 1/1997 | Catlin ............... B64D 43/02 73/170.02 |
| 6,273,371 B1 | 8/2001 | Testi |
| 6,424,408 B1 * | 7/2002 | Ooga ............... G01P 5/26 342/36 |
| 6,531,967 B2 * | 3/2003 | Djorup ............. G01P 5/12 340/968 |
| 8,602,361 B2 | 12/2013 | Wood |
| 10,101,443 B1 * | 10/2018 | LeGrand, III ...... B64C 39/024 |

(Continued)

FOREIGN PATENT DOCUMENTS

| | | | |
|---|---|---|---|
| EP | 3567374 A1 | 11/2019 | |
| EP | 3101504 B1 * | 9/2021 | ............. B64C 13/16 |

OTHER PUBLICATIONS

Extended European Search Report dated Mar. 19, 2021, received for corresponding European Application No. 20200598.9, 6 pages.

*Primary Examiner* — Peter J Macchiarolo
*Assistant Examiner* — Jermaine L Jenkins
(74) *Attorney, Agent, or Firm* — Kinney & Lange, P.A.

(57) ABSTRACT

Apparatus and associated methods relate to detecting turbulence of an airstream over an airfoil surface of an aircraft using a sequence of acoustic transducers attached to the airfoil surface of the aircraft along a path. Each of the sequence of acoustic transducers is configured to detect acoustic waves indicative of airstream condition proximate the acoustic transducer. A processor is configured to determine, for each of the sequence of acoustic transducers, a level of turbulence of the airstream proximate the acoustic transducer.

18 Claims, 4 Drawing Sheets

(56) References Cited

U.S. PATENT DOCUMENTS

| | | | |
|---|---|---|---|
| 11,016,114 B1* | 5/2021 | Sly | B64D 43/02 |
| 2011/0285550 A1* | 11/2011 | Maris | G01M 9/065 |
| | | | 702/45 |
| 2021/0047995 A1* | 2/2021 | Maris | F03D 7/0224 |

* cited by examiner

ACOUSTIC DETECTION OF STALL OVER A WING SURFACE

BACKGROUND

Stall warning and protection systems typically can rely on traditional angle of attack measurements from pneumatic or vane systems to determine stall margins of the aircraft. Such pneumatic-type or vane-type sensors generally can be mounted on the fuselage of the aircraft so as to measure the angle of attack at their mounting locations. These systems should be characterized for various systematic influences in order to correlate their measurements to a critical stall performance of a particular airfoil. Improved stall detection systems could improve safety, as well as provide more direct measurement of the airstream characteristics over an airfoil surface. Such improved systems could also permit high performance aircraft to maximize their flight envelopes.

SUMMARY

Apparatus and associated methods relate to a system for detecting characteristics of an airstream moving over an airfoil surface of an aircraft. The system includes a plurality of acoustic transducers positioned along the airfoil surface along a path. Each of the plurality of acoustic transducers is configured to detect acoustic waves indicative of an airstream condition proximate the acoustic transducer. The system also includes a processor configured to determine, for each of the sequence of acoustic transducers, a level of turbulence in the airstream proximate the acoustic transducer based on the acoustic waves detected.

Some embodiments relate to a method for detecting turbulence of an airstream over an airfoil surface of an aircraft. The method includes detecting, by a sequence of acoustic transducers attached to an airfoil surface of the aircraft along a path, acoustic waves indicative of airstream condition proximate the acoustic transducer. The method also includes determining, via a processor, a level of turbulence in the airstream proximate each of the sequence of acoustic transducers based on the acoustic waves detected.

DETAILED DESCRIPTION

Apparatus and associated methods relate to detecting turbulence of an airstream over an airfoil surface of an aircraft using a sequence of acoustic transducers attached to the airfoil surface of the aircraft along a path. Each of the sequence of acoustic transducers is configured to detect acoustic wave indicative of airstream condition proximate the acoustic transducer. A processor is configured to determine, for each of the sequence of acoustic transducers, based on the acoustic wave detected, a level of turbulence of the airstream proximate the acoustic transducer.

Figure 1:
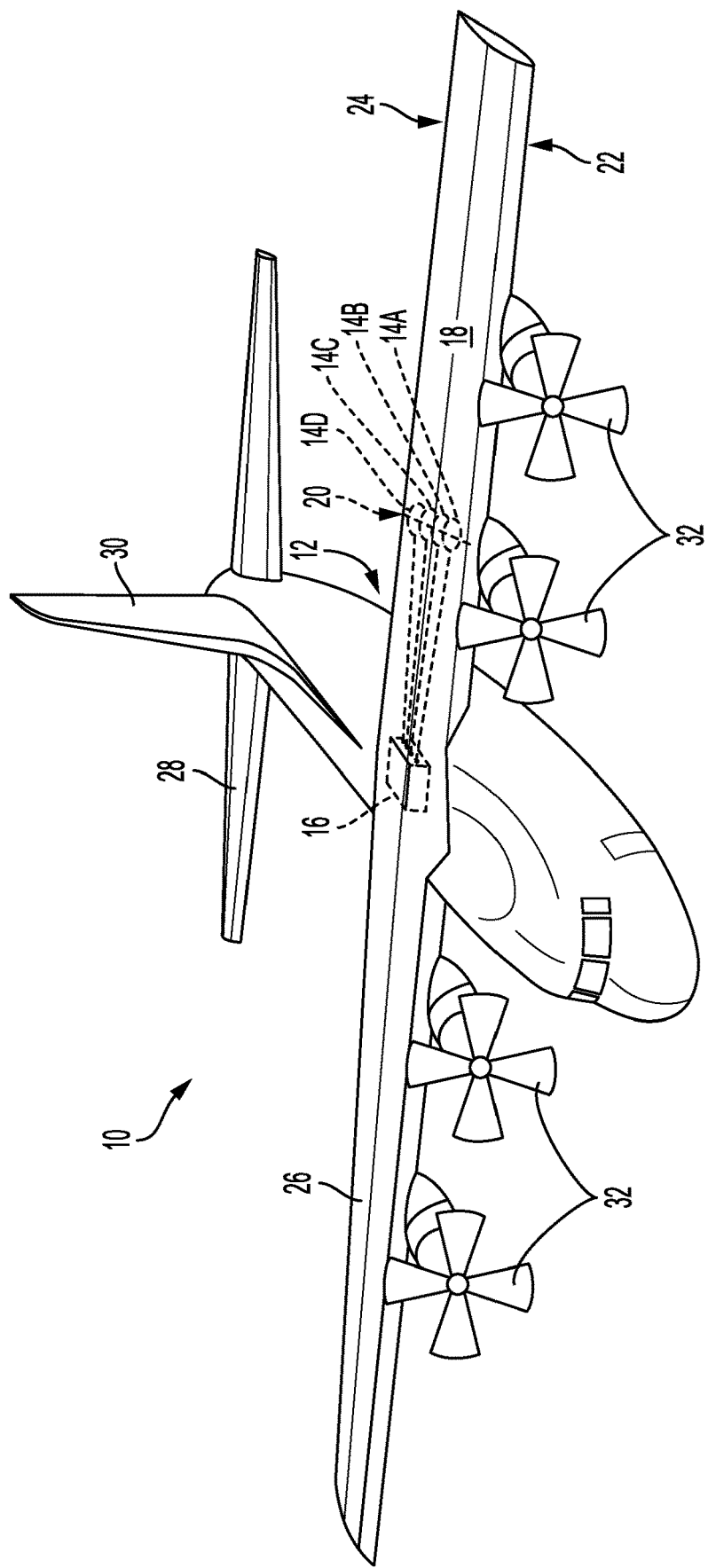
FIG. 1 is a schematic view of an aircraft engine equipped with an acoustic turbulence-detection system.

FIG. 1 shows a perspective view of an aircraft equipped with an acoustic turbulence-detection system. In FIG. 1, aircraft 10 includes acoustic turbulence-detection system 12. Acoustic turbulence-detection system 12 includes a sequence of acoustic transducers 14 and processor 16. Acoustic transducers 14A-14D are mounted to airfoil surface 18 of aircraft 10. Acoustic transducers 14 are mounted to airfoil surface 18 of aircraft 10 along path 20. Each of acoustic transducers 14A-14D is configured to detect acoustic wave indicative of an airstream condition proximate the acoustic transducer. Such airstream conditions can include laminar airflow, turbulent airflow, airflow separation, stagnant airflow, airflow velocity, etc. Processor 16 is in electrical communication with each of acoustic transducers 14A-14D. Processor 16 is configured to receive, from each of acoustic transducers 14A-14D, a signal indicative of acoustic wave detected. Processor 16 is further configured to determine the acoustic wave condition indicated by the acoustic wave detected as indicated by the signal received.

In some embodiments, acoustic transducers 14A are mounted to airfoil surface 18 along a path from a first location proximate leading edge 22 of airfoil surface 18 to a last location proximate a trailing edge 24 of airfoil surface 18. In some embodiments, path 20 along which acoustic transducers 14 are mounted is aligned along an airstream path along which the airstream flows. In some embodiments path 20 is coplanar with a plane that cross-sections airfoil surface 20.

In some embodiments, processor 16 is configured to determine, for each of acoustic transducers 14, the level of turbulence of the airstream proximate acoustic transducer 14 exceeds a predetermined level. In other embodiments, processor 16 can be configured to determine airflow velocities between adjacent acoustic transducers 14A-D as will be shown below. For example, processor 16 might determine that airflow is laminar proximate the first several acoustic transducers 14A-14C, but is turbulent proximate the last acoustic transducer 14D. Processor 16 might then determine a separation point at which flow separation occurs, based on the acoustic wave detected proximate acoustic transducers 14A-14D. The separation point at which flow separation occurs usually follows the point at which turbulent flow begins, for example. Thus, flow separation can be indicated by a marked increase in turbulence.

In some embodiments, airstream condition is determined by comparing amplitude of the acoustic wave detected that is within a turbulence-sensitivity frequency band with an amplitude threshold. Such spectral content of the acoustic wave detected can be indicative of a level of turbulence proximate the acoustic transducers 14A-14D. For example, a turbulence-sensitivity frequency band can be a frequency band in which the acoustic wave detected when the airstream is laminar is very dissimilar to the acoustic wave detected when the airstream is turbulent. In some embodiments, the acoustic wave detected in the turbulence-sensitivity frequency band is normalized by dividing the acoustic wave detected in the turbulence-sensitivity frequency band by a sum of the acoustic wave detected in another frequency band, such as, for example the entire frequency band in which acoustic transducers 14A-14D are sensitive.

Processor 16 can be further configured to generate a signal indicative of the airstream condition determined, and to provide the signal to an air-data storage system and/or a cockpit of aircraft 10. For example, processor 16 can be configured to generate a stall warning signal in response to the separation point determined being at a location fore of a predetermined stall-warning location.

In the depicted embodiment, airfoil surface 18 is a top surface of wing 26 of aircraft 10. In some embodiments, acoustic turbulence-detection system 12 can be configured to detect turbulence proximate other airfoil surfaces, such as, for example, horizontal stabilizer 28 or vertical stabilizer 30. In other embodiments, acoustic turbulence-detection system 12 can be configured to detect airflow-condition proximate propeller surfaces 32.

Figure 2:
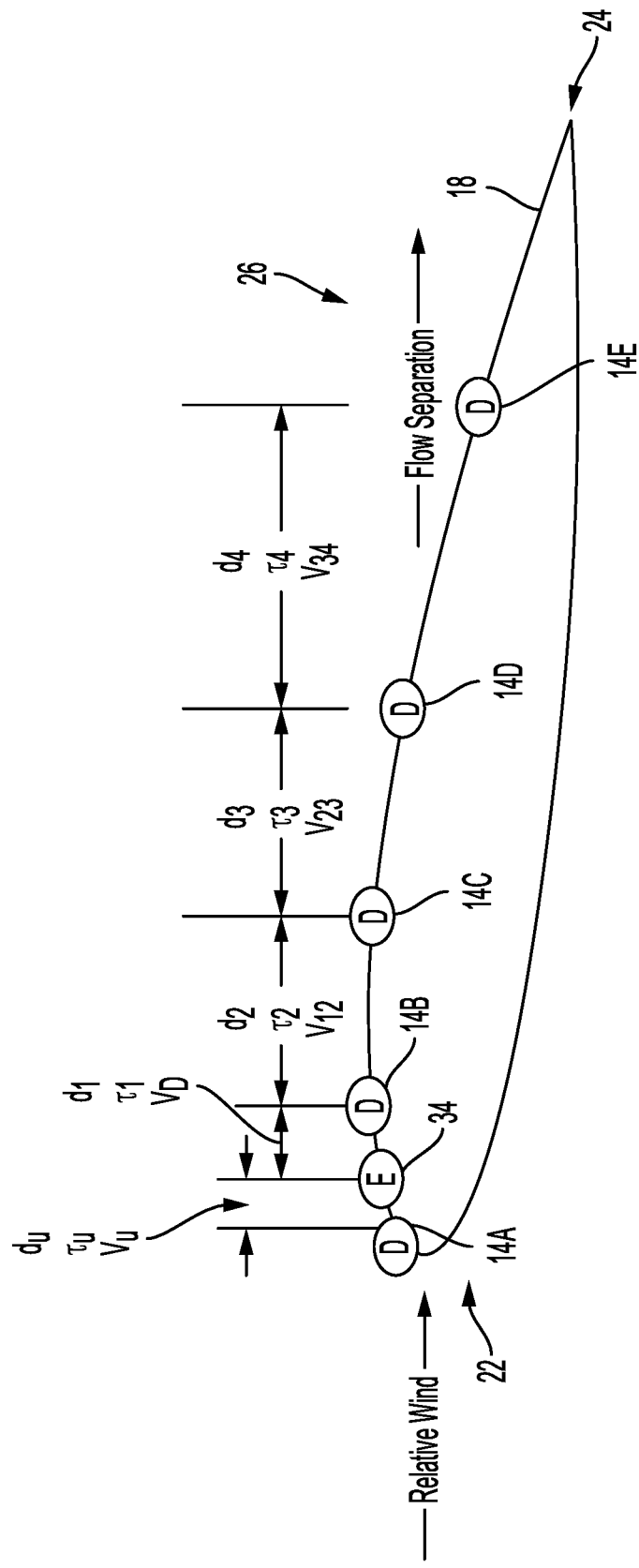
FIG. 2 shows cross-sectional views of an airfoil surface to which is attached a sequence of acoustic transducers for use with an acoustic turbulence-detection system.

FIG. 2 shows cross-sectional views of an airfoil surface to which is attached a sequence of acoustic transducers for use with an acoustic turbulence-detection system. In FIG. 2, wing 26 has airfoil surface 18 to which are mounted acoustic transducers 14A-14E and ultrasonic emitter 34. Acoustic transducers 14A-14E are mounted to airfoil surface 18 along a path from a first location proximate leading edge 22 to a last location proximate trailing edge 24. In the FIG. 2 embodiment, ultrasonic emitter 34 is also mounted along the path that acoustic transducers 14A-14E such that acoustic transducer 14A is mounted upstream of ultrasonic emitter 34, while acoustic transducers 14B-14E are mounted downstream of ultrasonic emitter 34. The acoustic turbulence-detection system, to which acoustic transducers 14A-14D and ultrasonic emitter 34 belong, can be used either passively as described above with reference to the embodiment depicted in FIG. 1, or actively as will be described below.

In the passive mode, acoustic transducers 14A-14E can be configured to detect acoustic wave proximate their locations on the path along airfoil surface 18. In the active mode, ultrasonic emitter 34 can be configured to emit an ultrasonic pulse into the airstream proximate ultrasonic emitter 34. The ultrasonic pulse emitted will be carried both upstream (for subsonic flying conditions) and downstream from ultrasonic emitter 34 so as to be detectable by acoustic transducers 14A-14E. Various airflow metrics can be determined based on the acoustic wave detected by acoustic transducers 14A-14E.

In active mode, ultrasonic emitter 34 is mounted proximate leading edge 22 of wing 26 and acoustic transducers 14A-14E are placed in sequence along a path from leading edge 22 to trailing edge 24 of airfoil surface 18. Ultrasonic emitter 34 emits an ultrasonic pulse into the airstream proximate ultrasonic emitter 34. Acoustic transducers 14A-14E detect the ultrasonic pulse emitted into the airstream at various times subsequent to the emission based on times of flight to the location to which acoustic transducers 14A-14E are mounted. Ultrasonic emitter 34 provides a pulse and the velocity of the airstream between ultrasonic emitter 34 and acoustic transducers 14A-14E, and the time of flight difference between adjacent pairs of acoustic transducers 14A-14E, can provide local velocity of the boundary layer of the airstream over airfoil surface 18. A separation point can be determined based on these calculated local velocities. For example, if a local velocity decreases below a threshold velocity, separation can be determined at the location of the aft acoustic transducer of the adjacent pair. Based on such location of a separation point, an impending stall condition can be predicted. The accuracy of the separation point is dependent on the number of acoustic transducers 14A-14E mounted along the path of airfoil surface 18.

Airspeed can also be determined based on acoustic wave propagation rates both upstream and downstream. The upstream 14A and downstream 14B acoustic transducers can detect the time of arrival of the ultrasonic pulse emitted by the ultrasonic emitter 34. The speed of acoustic wave can be determined. Such a speed of acoustic wave can be calculated as follows:

$$c = \frac{1}{2}\left(\frac{d_1}{\tau_1} + \frac{d_2}{\tau_2}\right), \quad (1)$$

where $d_1$ is the distance between ultrasonic emitter 34 the upstream acoustic transducer 14A, $d_2$ is the distance between ultrasonic emitter 34 and downstream acoustic transducers 14B, $\tau_1$ is the time delay between emission of the ultrasonic pulse and detection by upstream acoustic transducer 14A, and $\tau_2$ is the time delay between emission of the ultrasonic pulse and detection by downstream acoustic transducer 14B. The airspeed can then be determined as follows:

$$v_{air} = \frac{d_n - \tau_n c}{\tau_n}, \quad (2)$$

where $d_n$ is the distance between ultrasonic emitter 34 the $n^{th}$ acoustic transducer, and $\tau_n$ is the time delay between emission of the ultrasonic pulse and detection by the $n^{th}$ acoustic transducer.

Acoustic turbulence-detection system 12 can include other components so as to be configured to determine other airstream conditions and/or flight metrics. For example, acoustic turbulence-detection system 12 can include a local air temperature sensor for measuring local air temperature. Such a measurement of local air temperature can be used to determine viscosity of the airstream.

Figure 3:
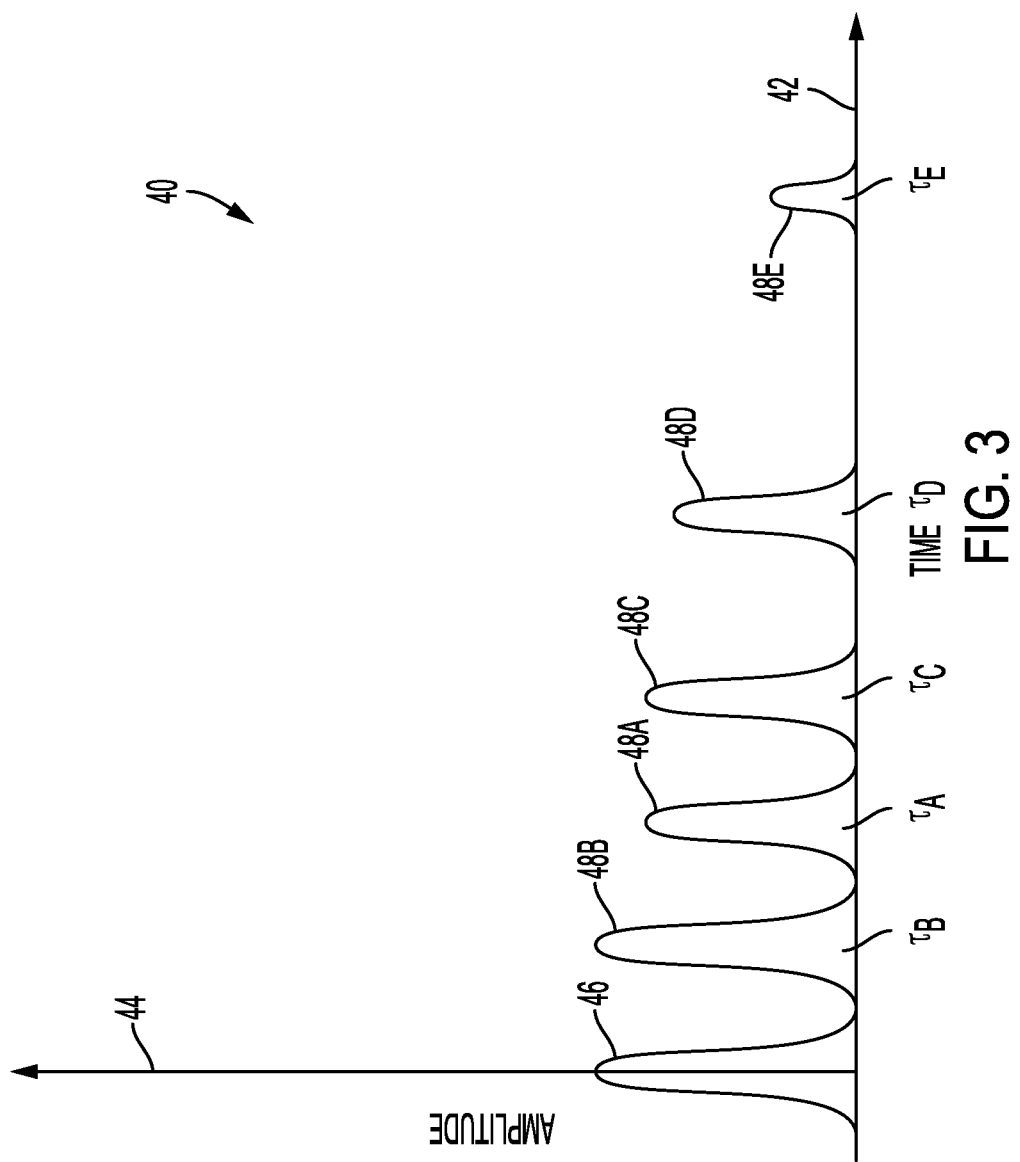
FIG. 3 is a graph depicting a relation between acoustic wave detected by a sequence of acoustic transducers and time.

FIG. 3 is a graph depicting a relation between acoustic wave detected by a sequence of acoustic transducers and time. In FIG. 3, graph 40 includes horizontal axis 42, vertical axis 44, and acoustic wave/time relations 46 and 48A-48E. Horizontal axis 42 is indicative of time, and vertical axis 44 is indicative of acoustic wave amplitude within a turbulence-sensitive frequency band. Acoustic wave/time relation 46 is indicative of an ultrasonic pulse emitted by ultrasonic emitter at time t=0. Acoustic wave/time relations 48A-48E are indicative of acoustic wave detected within the ultrasonic frequency band by acoustic transducers 14A-14E (depicted in FIG. 2), respectively.

As shown in FIG. 3, the first in time of acoustic wave/time relations 48A-48E is acoustic wave/time relation 48B as detected by acoustic transducer 14B. The speed that the emitted pulse travels downstream is faster than the speed that the emitted pulse travels upstream, and so acoustic wave/time relation 48B is indicative of the emitted ultrasonic pulse arriving at the location of acoustic transducer 14B before the emitted ultrasonic pulse arriving at the location of acoustic transducer 14A, even though acoustic transducer 14A is located nearer ultrasonic emitter 34 than is acoustic transducer 14B as depicted in FIG. 2. Second in time of acoustic wave/time relations 48A-48E is acoustic wave/time relation 48A as detected by acoustic transducer 14A. The airspeed of aircraft 10 assists the speed at which the ultrasonic pulse travels from ultrasonic emitter 34 to downstream acoustic transducers 14B-14E but hinders the speed at which the ultrasonic pulse travels from ultrasonic emitter 34 to upstream acoustic transducer 14A.

Third, fourth, and fifth in time of acoustic wave/time relations 48A-48E are acoustic wave/time relation 48C, 48D, and 48C as detected by acoustic transducers 14C, 14D, and 14E, respectively. Amplitudes of acoustic wave/time relations 48C, 48D, and 48E are monotonically decreasing as the distance that the emitted ultrasonic pulse must travel increases. The amplitude of acoustic wave/time relation 48E is substantially smaller than acoustic wave/time relations 48B-48D, which can indicate flow separation prior to the ultrasonic pulse arrival at acoustic transducer 14E. In some cases, broadening of detected acoustic wave/time relation 48E can be further indication of airflow separation prior to the ultrasonic pulse arrival at acoustic transducer 14E.

A local boundary layer velocity between any two adjacent pairs of acoustic transducers 14B-14E can be determined as:

$$v_{bl}(n) = \frac{(d_n - d_{n-1}) - (\tau_n - \tau_{n-1})c}{(\tau_n - \tau_{n-1})}, \quad (3)$$

where n is the index of the most downstream of the adjacent pair of acoustic transducers 14B-14E. The determined local boundary layer velocity $v_{bl}$ between adjacent pairs of acoustic transducers 14B-14E can be indicative of the airstream condition. As indicated in FIG. 3, the time difference ($t_E-t_D$) between the time at which ultrasonic pulse are detected by acoustic transducers 14D and 14E is indicative of an airspeed therebetween that is modest, in comparison with the airstream determined between pairs of acoustic transducers 14B-14D. If the determined local boundary layer velocity is less than a threshold value, the determined local boundary layer velocity can be indicative of flow separation and/or a stall condition. In some embodiments, a ratio of the local boundary layer velocity between adjacent acoustic transducers as determined by equation (3) and the computed airspeed as determined by equation (2) can be used to indicate flow separation and/or a stall condition. For example if such a ratio falls below a threshold, such as, for example 0.9, 0.7, 0.5, or 0.4, flow separation and/or a stall condition can be indicated.

In some embodiments, stall can be indicated by a combination of amplitude of acoustic wave detected by acoustic transducers 14B-14E within a turbulence-sensitive frequency band and local boundary layer velocity determined between adjacent pairs of acoustic transducers 14B-14E.

Figure 4:
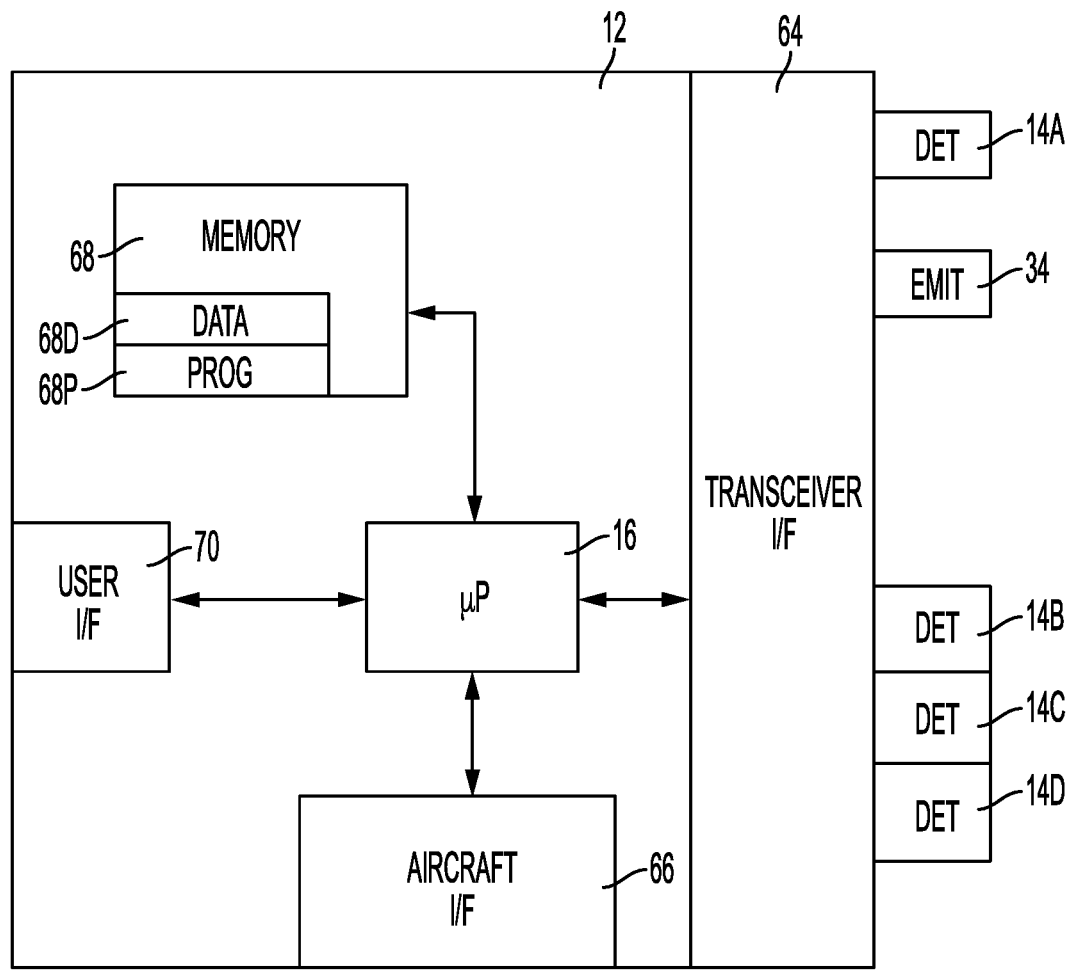
FIG. 4 is a block diagram of an acoustic turbulence-detection system.

FIG. 4 is a block diagram of an acoustic turbulence-detection system. In FIG. 4, acoustic turbulence-detection system 12 includes upstream acoustic transducer 14A, ultrasonic emitter 34, downstream acoustic transducers 14B-14D, processor 16, sensor interface 64, aircraft interface 66, storage device(s) 68, and user interface 70. Processor 16 can receive program instructions 68P from storage device(s) 68. Processor 16 can be configured to calculate airstream condition, based on signals received from and generated by upstream and/or downstream acoustic transducers 14A and 14B-14D, respectively, using program instructions 68P retrieved from storage device(s) 68. For example, processor 16 can be configured to signals, via sensor interface 64, indicative of ultrasonic pulse detected.

As illustrated in FIG. 4, acoustic turbulence-detection system 12 includes processor 16, aircraft interface 66, storage device(s) 58, and sensor interface 64. However, in certain examples, acoustic turbulence-detection system 12 can include more or fewer components. For instance, in some embodiments, acoustic turbulence-detection system 12 can include additional ultrasonic emitters and/or acoustic transducers. In some examples, acoustic turbulence-detection system 12 can be performed in one of various aircraft computational systems, such as, for example, an existing Full Authority Digital Engine Controller (FADEC) of the aircraft.

Processor 16, in one example, is configured to implement functionality and/or process instructions for execution within acoustic turbulence-detection system 12. For instance, processor 16 can be capable of processing instructions stored in storage device(s) 68. Examples of processor 16 can include any one or more of a microprocessor, a controller, a digital signal processor(s) (DSP), an application specific integrated circuit (ASIC), a field-programmable gate array (FPGA), or other equivalent discrete or integrated logic circuitry. Processor 16 can be configured to determine various airstream conditions.

Storage device(s) 68 can be configured to store information within acoustic turbulence-detection system 12 during operation. Storage device(s) 68, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, storage device(s) 68 is a temporary memory, meaning that a primary purpose of storage device(s) 68 is not long-term storage. Storage device(s) 68, in some examples, is described as volatile memory, meaning that storage device(s) 68 do not maintain stored contents when power to acoustic turbulence-detection system 12 is turned off. Examples of volatile memories can include random access memories (RAM), dynamic random access memories (DRAM), static random access memories (SRAM), and other forms of volatile memories. In some examples, storage device(s) 68 is used to store program instructions for execution by processor 16. Storage device(s) 68, in one example, is used by software or applications running on acoustic turbulence-detection system 12 (e.g., a software program calculating various airstream conditions).

Storage device(s) 68, in some examples, can also include one or more computer-readable storage media. Storage device(s) 68 can be configured to store larger amounts of information than volatile memory. Storage device(s) 68 can further be configured for long-term storage of information. In some examples, storage device(s) 68 include non-volatile storage elements. Examples of such non-volatile storage elements can include magnetic hard discs, optical discs, flash memories, or forms of electrically programmable memories (EPROM) or electrically erasable and programmable (EEPROM) memories.

Aircraft interface 66 can be used to communicate information between acoustic turbulence-detection system 12 and an aircraft. In some embodiments, such information can include aircraft conditions, flying conditions, and/or atmospheric conditions. In some embodiments, such information can include data processed by acoustic turbulence-detection system 12, such as, for example, alert signals. Aircraft interface 66 can also include a communications module. Aircraft interface 66, in one example, utilizes the communications module to communicate with external devices via one or more networks, such as one or more wireless or wired networks or both. The communications module can be a network interface card, such as an Ethernet card, an optical transceiver, a radio frequency transceiver, or any other type of device that can send and receive information. Other examples of such network interfaces can include Bluetooth, 3G, 4G, and Wi-Fi radio computing devices as well as Universal Serial Bus (USB). In some embodiments, communication with the aircraft can be performed via a communications bus, such as, for example, an Aeronautical Radio, Incorporated (ARINC) standard communications protocol. In an exemplary embodiment, aircraft communication with the aircraft can be performed via a communications bus, such as, for example, a Controller Area Network (CAN) bus.

User interface 70 can be used to communicate information between acoustic turbulence-detection system 12 and a user. In some embodiments, such information can include aircraft conditions, flying conditions, and/or atmospheric conditions. In some embodiments, such information can include data processed by acoustic turbulence-detection system 12, such as, for example, alert signals. User interface 70 can also include a communications module. User interface 70, in one example, utilizes the communications module to communicate with external devices via one or more networks, such as one or more wireless or wired networks or both. The communications module can be a network interface card, such as an Ethernet card, an optical transceiver, a radio frequency transceiver, or any other type of device that can send and receive information. Other examples of such network interfaces can include Bluetooth, 3G, 4G, and Wi-Fi radio computing devices as well as Universal Serial Bus (USB). In some embodiments, communication with the aircraft can be performed via a communications bus, such as, for example, an Aeronautical Radio, Incorporated (ARINC) standard communications protocol. In an exemplary embodiment, aircraft communication with the aircraft can be performed via a communications bus, such as, for example, a Controller Area Network (CAN) bus.

Discussion of Possible Embodiments

The following are non-exclusive descriptions of possible embodiments of the present invention.

Apparatus and associated methods relate to a system for detecting characteristics of an airstream moving over an airfoil surface of an aircraft. The system includes a plurality of acoustic transducers positioned along the airfoil surface along a path. Each of the plurality of acoustic transducers is configured to detect acoustic waves indicative of an airstream condition proximate the acoustic transducer. The system also includes a processor configured to determine, for each of the sequence of acoustic transducers, a level of turbulence in the airstream proximate the acoustic transducer based on the acoustic waves detected.

The system of the preceding paragraph can optionally include, additionally and/or alternatively, any one or more of the following features, configurations and/or additional components:

A further embodiment of the foregoing system, wherein the sequence of acoustic transducers can be positioned along the path from a first location proximate a leading edge of the airfoil surface to a last location proximate a trailing edge of the airfoil surface.

A further embodiment of any of the foregoing systems, wherein the path can be along the airstream over the airfoil surface.

A further embodiment of any of the foregoing systems, wherein the level of turbulence in the airstream proximate the acoustic transducer can be determined by comparing amplitude and/or spectral content of the acoustic wave detected that is within a turbulence-sensitivity frequency band with an amplitude threshold and/or a spectral content reference, respectively.

A further embodiment of any of the foregoing systems, wherein the processor can be further configured to determine a point of flow separation along the path based on the determined level of turbulence and on corresponding ones of the plurality of acoustic transducers whose detected acoustic waves are indicative of the determined level of turbulence.

A further embodiment of any of the foregoing systems, wherein the processor can be further configured to generate a stall warning signal in response to the point of flow separation determined being at a location fore of a predetermined stall-warning location.

A further embodiment of any of the foregoing systems can further include an ultrasonic emitter configured to be attached to the airfoil surface of the aircraft, the ultrasonic emitter configured to emit an ultrasonic pulse into the airstream over the airfoil surface of the aircraft.

A further embodiment of any of the foregoing systems, wherein the ultrasonic emitter is positioned along the path.

A further embodiment of any of the foregoing systems, wherein each of the sequence of acoustic transducers can be further configured to detect the ultrasonic pulse emitted into the airstream.

A further embodiment of any of the foregoing systems, wherein the processor is further configured to determine local boundary layer velocity between adjacent pairs of the sequence of acoustic transducers based on times of detection of the ultrasonic pulses detected by the acoustic transducers.

A further embodiment of any of the foregoing systems, wherein the local boundary layer velocity of the aircraft between adjacent pairs of the sequence of acoustic transducers can be determined as:

$$v_{bl}(n) = \frac{(d_n - d_{n-1}) - (\tau_n - \tau_{n-1})c}{(\tau_n - \tau_{n-1})},$$

where $d_n - d_{n-1}$ is a distance between the $n^{th}$ and $(n-1)^{th}$ pair of adjacent acoustic transducers, $\tau_d - \tau_{d-1}$ is the time difference between detection of the ultrasonic pulse the $n^{th}$ and $(n-1)^{th}$ pair of adjacent acoustic transducers, and c is the speed of sound in the airstream moving over the airfoil surface.

Some embodiments relate to a method for detecting turbulence of an airstream over an airfoil surface of an aircraft. The method includes detecting, by a sequence of acoustic transducers attached to an airfoil surface of the aircraft along a path, acoustic waves indicative of airstream condition proximate the acoustic transducer. The method also includes determining, via a processor, a level of turbulence in the airstream proximate each of the sequence of acoustic transducers based on the acoustic waves detected.

The method of the preceding paragraph can optionally include, additionally and/or alternatively, any one or more of the following features, configurations and/or additional components:

A further embodiment of the foregoing method, wherein the sequence of acoustic transducers are attached to the airfoil surface along a path from a first location proximate a leading edge of the airfoil surface to a last location proximate a trailing edge of the airfoil surface, the path being along the airstream over the airfoil surface.

A further embodiment of any of the foregoing methods, wherein determining a level of turbulence in the airstream can include comparing amplitude of the acoustic wave detected that is within a turbulence-sensitivity frequency band with an amplitude threshold.

A further embodiment of any of the foregoing methods can further include generating, via the processor, a stall warning signal in response to the determined level of turbulence and acoustic transducers whose detected acoustic waves are indicative of the determined level of turbulence.

A further embodiment of any of the foregoing methods can further include emitting, via an ultrasonic emitter attached to the airfoil surface of the aircraft, an ultrasonic pulse into the airstream over the airfoil surface of the aircraft.

A further embodiment of any of the foregoing methods can further include detecting, via each of the sequence of acoustic transducers, the ultrasonic pulse emitted into the airstream.

A further embodiment of any of the foregoing methods can further include determining, by the processor, local boundary layer velocity between adjacent pairs of the sequence of acoustic transducers based on times of detection of the ultrasonic pulses detected by the acoustic transducers.

A further embodiment of any of the foregoing methods, wherein the local boundary layer velocity of the aircraft between adjacent pairs of the sequence of acoustic transducers can be determined as:

$$v_{bl}(n) = \frac{(d_n - d_{n-1}) - (\tau_n - \tau_{n-1})c}{(\tau_n - \tau_{n-1})},$$

where $d_n - d_{n-1}$ is a distance between the $n^{th}$ and $(n-1)^{th}$ pair of adjacent acoustic transducers, $\tau_d - \tau_{d-1}$ is the time difference between detection of the ultrasonic pulse the $n^{th}$ and $(n-1)^{th}$ pair of adjacent acoustic transducers, and c is the speed of sound in the airstream moving over the airfoil surface.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for detecting characteristics of an airstream moving over an airfoil surface of an aircraft, the system comprising:
    an ultrasonic emitter configured to be attached to the airfoil surface of the aircraft, the ultrasonic emitter configured to emit an ultrasonic pulse into the airstream over the airfoil surface of the aircraft;
    a plurality of acoustic transducers positioned along the airfoil surface along a path, each of the plurality of acoustic transducers being configured to detect acoustic waves indicative of an airstream condition proximate the acoustic transducer; and
    a processor configured to determine, for each of the sequence of acoustic transducers, a level of turbulence in the airstream proximate the acoustic transducer based on the acoustic waves detected.

2. The system of claim 1, wherein the sequence of acoustic transducers are positioned along the path from a first location proximate a leading edge of the airfoil surface to a last location proximate a trailing edge of the airfoil surface.

3. The system of claim 2, wherein the path is along the airstream over the airfoil surface.

4. The system of claim 2, wherein the ultrasonic emitter is positioned along the path.

5. The system of claim 4, wherein each of the sequence of acoustic transducers is further configured to detect the ultrasonic pulse emitted into the airstream.

6. The system of claim 5, wherein an upstream one of the sequence of acoustic transducers is configured to be attached upstream of the ultrasonic emitter, and a downstream one of the sequence of acoustic transducers is configured to be attached downstream of the ultrasonic emitter.

7. The system of claim 5, wherein the processor is further configured to determine local boundary layer velocity between adjacent pairs of the sequence of acoustic transducers based on times of detection of the ultrasonic pulses detected by the acoustic transducers.

8. The system of claim 7, wherein the local boundary layer velocity of the aircraft between adjacent pairs of the sequence of acoustic transducers is determined as:

$$v_{bl}(n) = \frac{(d_n - d_{n-1}) - (\tau_n - \tau_{n-1})c}{(\tau_n - \tau_{n-1})},$$

where $d_n - d_{n-1}$ is a distance between the $n^{th}$ and $(n-1)^{th}$ pair of adjacent acoustic transducers, $\tau_d - \tau_{d-1}$ is the time difference between detection of the ultrasonic pulse the $n^{th}$ and $(n-1)^{th}$ pair of adjacent acoustic transducers, and c is the speed of sound in the airstream moving over the airfoil surface.

9. The system of claim 1, wherein the level of turbulence in the airstream proximate the acoustic transducer is determined by comparing amplitude and/or spectral content of the acoustic wave detected that is within a turbulence-sensitivity frequency band with an amplitude threshold and/or a spectral content reference, respectively.

10. The system of claim 9, wherein the processor is further configured to determine a point of flow separation along the path based on the determined level of turbulence and on corresponding ones of the plurality of acoustic transducers whose detected acoustic waves are indicative of the determined level of turbulence.

11. The system of claim 1, wherein the processor is further configured to generate an output signal indicative of the detected airstream characteristics in response to detected level of turbulence in the airstream proximate the acoustic transducer.

12. A method for detecting turbulence of an airstream over an airfoil surface of an aircraft, the method comprising:
    emitting, via an ultrasonic emitter attached to the airfoil surface of the aircraft, an ultrasonic pulse into the airstream over the airfoil surface of the aircraft;
    detecting, by a sequence of acoustic transducers attached to an airfoil surface of the aircraft along a path, acoustic wave indicative of airstream condition proximate the acoustic transducer; and
    determining, via a processor, a level of turbulence in the airstream proximate each of the sequence of acoustic transducers based on the acoustic wave detected.

13. The method of claim 12, wherein the sequence of acoustic transducers are attached to the airfoil surface along a path from a first location proximate a leading edge of the airfoil surface to a last location proximate a trailing edge of the airfoil surface, the path being along the airstream over the airfoil surface.

14. The method of claim 12, wherein determining a level of turbulence in the airstream comprises:
   comparing amplitude of the acoustic wave detected that is within a turbulence-sensitivity frequency band with an amplitude threshold.

15. The method of claim 12, further comprising:
   generating, via the processor, an output signal indicative of the detected airstream characteristics in response to detected level of turbulence in the airstream proximate the acoustic transducer.

16. The method of claim 12, further comprising:
   detecting, via each of the sequence of acoustic transducers, the ultrasonic pulse emitted into the airstream.

17. The method of claim 16, further comprising:
   determining, by the processor, local boundary layer velocity between adjacent pairs of the sequence of acoustic transducers based on times of detection of the ultrasonic pulses detected by the acoustic transducers.

18. The method of claim 17, wherein the local boundary layer velocity of the aircraft between adjacent pairs of the sequence of acoustic transducers is determined as:

$$v_{bl}(n) = \frac{(d_n - d_{n-1}) - (\tau_n - \tau_{n-1})c}{(\tau_n - \tau_{n-1})},$$

where $d_n - d_{n-1}$ is a distance between the $n^{th}$ and $(n-1)^{th}$ pair of adjacent acoustic transducers, $\tau_d - \tau_{d-1}$ is the time difference between detection of the ultrasonic pulse the $n^{th}$ and $(n-1)^{th}$ pair of adjacent acoustic transducers, and c is the speed of sound in the airstream moving over the airfoil surface.

* * * * *